MARTIN & NICHOLSON.
Fruit Can.
No. 1,353. Reissued Nov. 4, 1862.
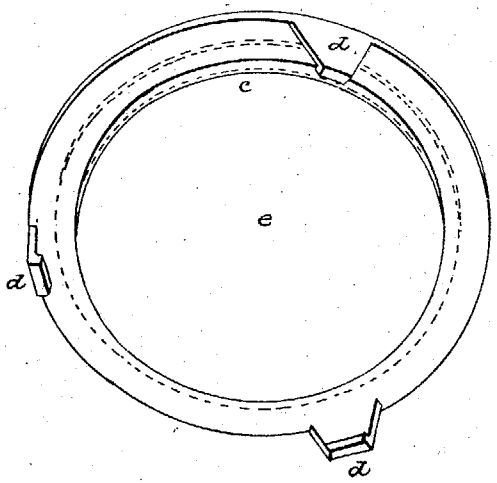
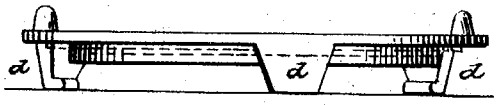
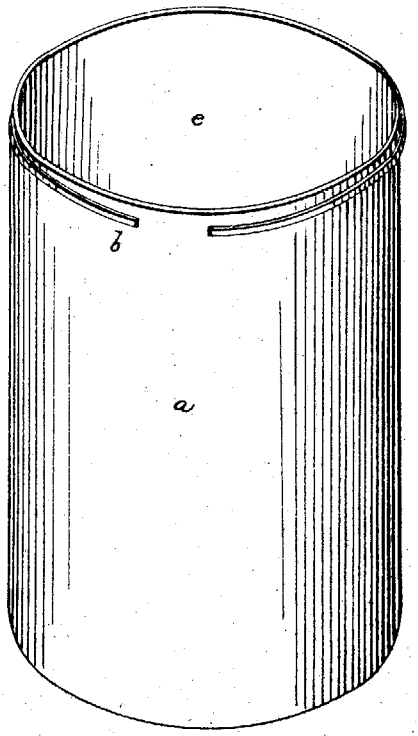

UNITED STATES PATENT OFFICE.

JOHN C. LEFFERTS, OF NEW YORK, N. Y., ASSIGNEE OF JAMES F. MARTIN AND HENRY C. NICHOLSON, OF MOUNT WASHINGTON, OHIO.

IMPROVEMENT IN PRESERVE-CANS.

Specification forming part of Letters Patent No. 24,962, dated February 15, 1859; Reissue No. 1,353, dated November 4, 1862.

*To all whom it may concern:*

Be it known that JAMES F. MARTIN and HENRY C. NICHOLSON, both of Mount Washington, Hamilton county, Ohio, invented a new and useful Provision-Can for the Preservation of Substances by Hermetically Sealing; and I do hereby declare the following to be a full and exact description of the same, reference being had to the accompanying drawings, making part of this specification.

To the use of self-sealing cans as at present constructed there are many and serious objections, which will be apparent when we come to consider the many different kinds of materials of which they are composed. Self-sealing cans such as are now in use may be divided into two classes—to wit, mineral and metallic. Familiar examples of the former are earthenware and glass jars, and of the second, tin. To the first of these housekeepers raise the serious and reasonable objections of their frangibility and of the great difficulty experienced in securely sealing them, because of the irregularity of their shrinkage in cooling after being heated for the purpose of expelling the air, and also because of the difficulty of forming a good and lasting connection between metal and earthenware or glass when a metallic cover is used, which is the only practicable mode that can be adopted, an illustration of which may be found in the glass jars in common use for the preservation of prunes.

Another objection to the use of pottery-ware arises from the glaze of such ware, because of the presence of large quantities of poisonous metallic oxides, which are easily acted upon by the acids of the fruits, &c., intended to be preserved. In reference to the second or tin cans, all persons at all conversant with the nature and properties of fruits will readily and instantly perceive how little adapted are any of the baser metals for their preservation, because of the presence of the vegetable acids in them, which act vigorously upon such metals, corroding the cans, entirely destroying the finer and more delicate flavor of the fruit, and communicating to it disagreeable metallic taste, at once unpalatable and unwholesome to those using them.

Another serious objection to the tin can is the impossibility of perfectly excluding the air.

The numerous soldered joints and the liability of tin to become dented in use cause a large percentage of the cans to be defective, resulting in the destruction of the fruit intended to be preserved. Again, in practice it has been found that with the use of tin, (because of its lack of rigidity and strength,) cans of all sizes are compelled to be made with narrow and contracted mouths, causing great trouble and inconvenience in the insertion and removal of the fruit. Notwithstanding all these drawbacks, however, it is true there are many who, rather that be without the fruit, &c., still use the tin in preference to the mineral jars, because of the liability of the latter to break with heat or by any accidental concussion, and because of the liability of the glaze of stoneware to become cracked or "crazed," affording numerous minute communications with the exterior.

To provide a can that is not subject to these objections, one that will be at once strong, not liable to be broken, impervious to the air, and not subject to the corroding action of the acids contained in the fruits, &c., is the object of this improvement; and it consists in constructing cans for the preservation of fruit or provisions of iron or other metal lined on the inside with a vitreous material capable of withstanding the chemical action of the acids of the fruit.

In the accompanying drawings, Figure 1 is a perspective view of a can illustrating this improvement. Fig. 2 is a perspective view of the under side of the cover. Fig. 3 is a side view of the cover.

*b* represents a screw-thread formed round the exterior of the mouth of the can *a*; *d d*, lugs on the cover, which engage with the screw-thread *b*, so that the turning of the cover will cause it to be closed tightly down; *c*, an india-rubber or other gasket, which may be interposed between the can and cover to assist in forming an air-tight joint; *f f*, studs projecting from the top of the cover to turn the latter by means of a suitable key. The can is manufactured of cast or rolled metal by any suitable means and in any desired form, and its whole interior surface, *e*, is covered with a lining of enamel or other vitreous body to resist the action of the acids contained in the substances to be preserved. This lining may be applied by fusion or in any other efficient way which will accomplish the object above set forth. The cover of the can may be constructed and lined with like material. A can thus constituted may be made as light as one entirely of glass or of clay, and still possess almost incomparably greater strength, and at the same time be as free as common glassware from liability to corrosion by acids. It is therefore economical, wholesome, readily cleansable, and admits of being used season after season as long as desired. The metal on the exterior and the vitreous lining within afford such mutual support that neither the metal nor the glass is required to be as thick as is needful when used alone to prevent bending or fracture.

It is believed that a non-corrosive hermetically-sealed provision-can has never before been produced capable of excluding the atmosphere from its contents after being subjected to severe frost, or adapted to preserve perishable articles of diet with sufficient economy and success as to be extensively used for this purpose in long sea voyages. It is also believed that the present is the first example of a provision-can constructed of any strong material which can be used to preserve delicate fruits without detriment to their flavor or quality.

The invention is not confined to any specific metal for the exterior of the can, nor to any specific vitreous material for the lining thereof; neither is it limited to any form of can or to any specific means of fastening the same.

The following is that which is claimed as new in the invention of the above-named JAMES F. MARTIN and HENRY C. NICHOLSON, and which it is desired to secure by Letters Patent:

1. A fruit or provision can to be hermetically sealed or tightly closed, constructed of metal lined on the inside with a vitreous body to resist the action of acids contained in the substances to be preserved.

2. A vitreously-enameled iron provision can or jar, substantially as herein set forth.

3. The combination of a vitreously-lined metallic cover with a preserve-jar, substantially as set forth.

JNO. C. LEFFERTS.

Witnesses:

JOHN A. LEFFERTS,
OCTAVIUS KNIGHT.